Patented Nov. 23, 1943

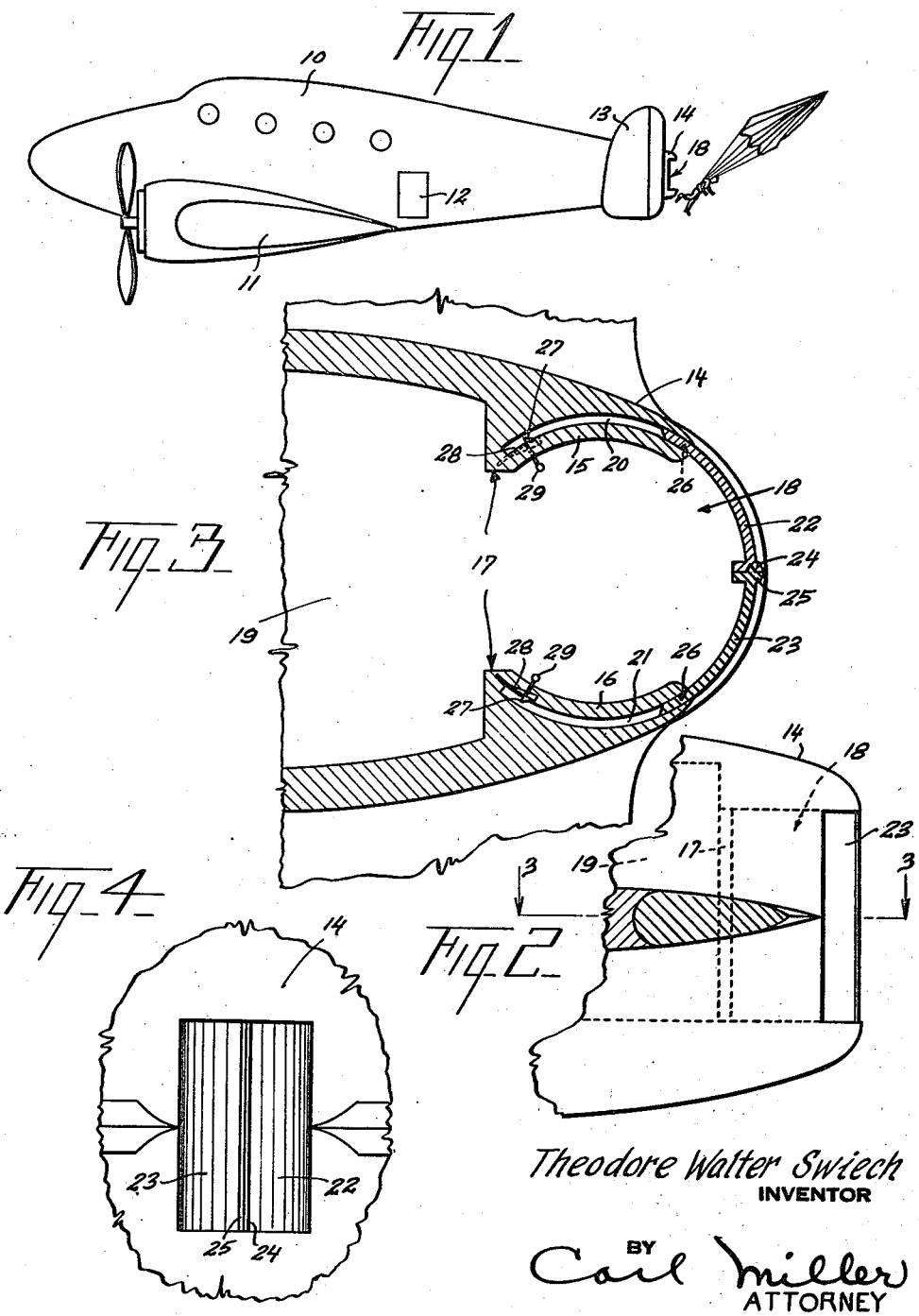

2,335,090

UNITED STATES PATENT OFFICE 2,335,090

PARACHUTE JUMPER'S HATCH FOR AIRPLANES

Theodore Walter Swiech, New York Mills, N. Y.

Application August 27, 1941, Serial No. 408,508

1 Claim. (Cl. 244—129)

This invention relates to airplanes and more particularly it is the principal object of this invention to provide a hatch at the rear of the fuselage of the airplane through which a person equipped with a parachute may safely jump, the invention being applicable either to civil or military airplanes. In the conventional form of airplane a parachute jumper exits from the plane either through a doorway in the side of the plane or from the cockpit of the plane. In either case both the doorway or the cockpit are in close proximity to the wings, rudders or landing gear of the airplane such that great danger exists in the parachute not clearing the same and thus becoming entangled therewith thereby endangering the life of the parachute jumper and the safety of the plane and its passengers. This invention contemplates the provision of a special hatch at the tail end of the airplane fuselage that may be opened from the interior of the plane to provide an opening and platform through which the parachute jumper may safely jump rearwardly in a direction away from the plane, the plane in the meanwhile continuing in its forward movement. In this manner there is no danger of the parachute tangling with any of the extending structure of the airplane.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Figure 1 is a side elevational view of an airplane provided with parachute jumper's hatch opened in tail end of airplane.

Figure 2 shows in side elevation the tail of the airplane with the hatch closed.

Figure 3 is a sectional view taken on line 3—3, Fig. 2, showing hatch and door construction.

Figure 4 is an end elevational view of the tail of the airplane with hatch doors closed.

Referring to the drawing in detail, 10 denotes the fuselage of an airplane provided with conventional wings 11, side door 12 and rudders 13 at the tail end 14.

Preferably in applying this invention to airplanes the tail end 14 thereof should be constructed so as to provide a height sufficient to permit a person to stand and walk therethrough although the height need not be sufficient to permit the person to stand or walk erect. Thus, the tail end 14 of the airplane shows a preferred hatch construction wherein the interior vertical side walls 15 and 16 are of segmental cylindrical curvature the inner edges thereof defining an entrance 17 communicating the interior of the hatch 18 with a passageway 19. The side walls 15 and 16 are equidistantly spaced from the vertical longitudinal center plane of the fuselage. Provided within the side walls 15 and 16 in concentric relation thereto are the cylindrical curved openings 20 and 21, each of which slidably receives, respectively, a sliding cylindrically curved door 22 and 23.

The sliding doors 22 and 23 are each provided at the opposed edges thereof with interengaging mating flanges 24 and 25 to insure a tight weather proof connection when the doors are closed. Suitable means (not shown) is provided in the interior of the hatch for maintaining the doors locked and by which the doors may be unlocked to permit the same to be opened by a sliding movement into the door receiving openings 20 and 21. At their innermost ends each door is provided with a recessed shoulder 26 adapted to be engaged by a spring pressed holding latch 27 when the doors are completely slid into their respective openings. In the form shown the holding latch 27 is mounted on a flat leaf spring 28, there being provided a handle 29 for pulling the latch free from its engagement with its associated shoulder 26.

The doors 22 and 23 when opened are wholly within the door receiving openings 20 and 21, and are held therein against outward movement by the holding latches 27. There is thus provided an unobstructed exit passage for the hatch 18 through which a parachute jumper may freely step into space as clearly shown in Fig. 1. As the airplane moves forwardly it is clearly apparent that the parachute can never foul on any part thereof.

Having thus set forth and disclosed the nature of this invention, what is claimed is:

In an airplane, a parachute jumper's hatch in the tail end of the fuselage of the airplane, said hatch comprising opposed side walls of segmental cylindrical curvature each equidistantly spaced from the vertical longitudinal center plane of the fuselage and defining a forward entry passage and a rear exit passage located at the extreme terminal tail end of said fuselage, a pair of sliding doors for said exit passage each of segmental cylindrical curvature, said hatch walls each having an opening for wholly receiving therein an adjacent sliding door, and holding latch means adapted to engage each of said sliding doors for locking the same when within its associated opening, said sliding doors having at their opposed outer ends mating flanges arranged to abut each other in said vertical longitudinal center plane to provide a weatherproof seal, and said holding latch means comprising a shouldered opening formed in each sliding door adjacent the inner edge thereof, a spring pressed holding latch mounted within each door receiving opening adapted to seat in said shouldered opening and a handle means on each holding latch projecting through said hatch wall for releasing said holding latch.

THEODORE W. SWIECH.